United States Patent Office 3,775,302
Patented Nov. 27, 1973

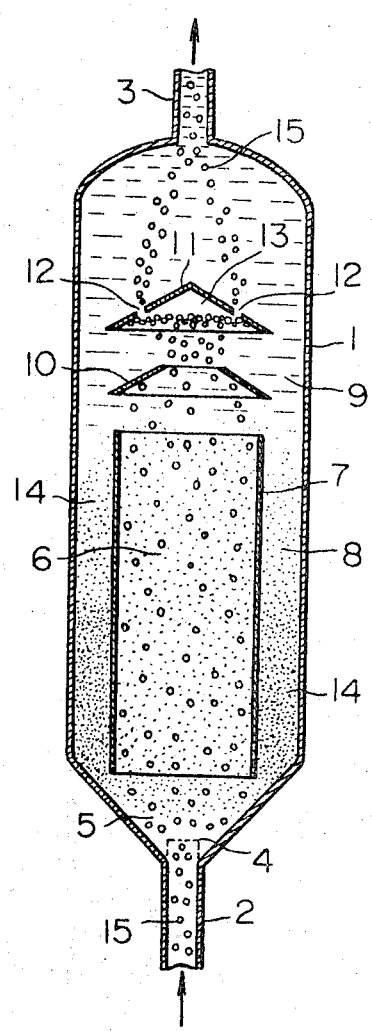

3,775,302
PREVENTION OF EFFLUX OF HYDRODE-
SULFURIZATION CATALYST PARTICLES
Junichi Kubo and Yoshihisa Koiwai, Kawasaki, Japan, assignors to Agency of Industrial Science and Technology, Tokyo, Japan
Filed Dec. 22, 1971, Ser. No. 210,751
Claims priority, application Japan, Dec. 26, 1970, 45/118,718
Int. Cl. C10g 23/06
U.S. Cl. 208—157                 5 Claims

ABSTRACT OF THE DISCLOSURE

In a method for catalytic hydrodesulfurization of a heavy petroleum hydrocarbon oil in a reactor composed of a cylindrical pressure vessel and a cylindrical inner pipe, in which hydrogen gas, oil liquid and solid catalyst particles are concurrently present and the catalyst particles are fluidized and recycled in the reactor without flowing out of the reactor, an improvement for the prevention of the catalyst's efflux is achieved by the provision of a bubble-collecting plate and a catalyst particles-catching plate above the inner pipe in the reactor.

---

This invention relates to a method for preventing efflux of catalyst particles in a reactor for catalytic hydrodesulfurization of heavy petroleum hydrocarbon oil, in which gas, liquid, and the catalyst are concurrently present and the catalyst particles are fluidized, by the provision of a bubble-collecting plate and a catalyst particles-catching plate.

In catalytic hydrodesulfurization of heavy petroleum hydrocarbon oil in general, extremely short catalyst life presents a serious problem, because the desulfurization catalyst is violently attached by the asphaltene, heavy metals, etc. in the oil. Therefore, it is essential for more economical practice of catalytic hydrodesulfurization of heavy petroleum hydrocarbon oil, to develop desulfurization catalysts of high desulfurization activity and long life. We have previously disclosed a catalytic hydrogenation process of heavy petroleum oil which achieves better effect than the conventional catalytic processes (U.S. Pat. No. 3,583,905).

One embodiment of our proposed processes for catalytic hydrodesulfurization of heavy petroleum hydrocarbon oil comprises, using a desulfurizing reactor composed of a cylindrical pressure vessel accommodating therein a coaxially positioned, cylindrical inner pipe and carrying out, the steps of:

(a) Feeding the hydrodesulfurization catalyst particles into the hydrodesulfurizing reactor;

(b) Introducing heavy petroleum hydrocarbon oil and hydrogen-containing gas into the reactor from the lower part of the inner pipe to substantially fluidize the catalyst particles;

(c) Causing upflow of the mixture of oil, hydrogen-containing gas and catalyst particles in the inner pipe, while performing the desulfurization reaction;

(d) Overflowing the mixture from the top of the inner pipe into the catalyst-separating zone which is positioned in the pressure vessel, adjacent to the upper part of the inner pipe, wherein the hydrodesulfurization catalyst starts to separate from the gas-liquid mixture due to the decrease in linear flow rate of the first-formed mixture caused by the greater cross-sectional area than that of the inner pipe;

(e) Settling the hydrodesulfurization catalyst thus separated at the catalyst-separating zone, at the catalyst-settling zone defined by the inner wall of pressure vessel and the outer wall of the inner pipe;

(f) Upflowing the settled catalyst again together with the heavy petroleum hydrocarbon oil and hydrogen-containing gas fed from the bottom of the inner pipe in a substantially fluidized form, and (g) Withdrawing from the catalyst-separating zone the hydrodesulfurized heavy petroleum hydrocarbon oil separated from the catalyst via the upper part of the pressure vessel.

With the catalytic hydrodesulfurization process as above, the contact of heavy petroleum hydrocarbon oil, hydrogen-containing gas, and hydrodesulfurization catalyst, can be uniformly performed, operating conditions of the reactor can be allowed greater freedom of selection, and furthermore the withdrawal of used catalyst and feeding of new or regenerated catalyst can be effected without interrupting the continuous operation, thus prolonging the continuously operable period.

Generally speaking in hydrodesulfurization processes using fluidized catalyst particles, smaller particle sizes greatly increase the surface area of the catalyst per unit weight thereof and consequently, the hydrodesulfurization activity. Therefore, normally a catalyst of smaller particle sizes is used with greater advantage. On the other hand, however, a smaller particle size catalyst shows a greater tendency to flow out of the reaction system from the upper part of the reactor, accompanying the hydrodesulfurized heavy petroleum hydrocarbon oil. Because the overflow and separation of catalyst particles are performed as above-described in the fluidization-overflow bed of our previously proposed process, even very small particle size catalyst, for example, 0.1–1 mm. in average diameter, can be used effectively. Thus the proposed process achieved the improvement of enlarging the allowable range of catalyst particle size. However, such process still cannot completely prevent the accompanying outflow of a minor amount of fine particle size catalyst, leaving room for further improvement. The outflow of such catalyst particles takes place not only as entrained by the liquid heavy petroleum hydrocarbon oil, but also as adsorbed by the bubbles of hydrogen-containing gas rising through the reaction system, due to the adsorbing action at gas-liquid interface. Even the minor amount of the catalyst carried out of the reaction system with the oil settles and accumulates at the subsequent paths in the reactor such as pipes, valves and pump, etc., causing interruption of the operation and eventually reactor breakdown. Therefore, the outflow of catalyst particles must be completely prevented.

The object of the present invention is to provide a novel process for preventing the accompanying outflow of catalyst particles in the catalytic hydrodesulfurization of heavy petroleum hydrocarbon oil in the already described fluidization-overflow bed. In this application, the term "heavy petroleum hydrocarbon oil" means petroleum hydrocarbons including asphaltene, for example, atmospheric or reduced pressure distillation residue oil, etc.

It has now been discovered that the entrainment and outflow of catalyst particles can be very effectively prevented by providing a funnel-shaped bubble-collecting plate and a catalyst particle-catching plate in the catalyst-separating zone at the upper part of the reactor.

According to the process of this invention for the catalytic hydrodesulfurization of heavy petroleum hydrocarbon oil, a desulfurization reactor composed of a cylindrical pressure vessel accommodating therein a coaxially positioned cylindrical inner pipe is employed, and the process steps comprise:

(a) Feeding the hydrodesulfurization catalyst particles into the hydrodesulfurizing reactor;

(b) Introducing heavy petroleum hydrocarbon oil and hydrogen-containing gas into the reactor from the lower part of the inner pipe to substantially fluidize the hydrodesulfurization catalyst particles;

(c) Upflowing the mixture of the heavy petroleum hydrocarbon oil, hydrogen-containing gas, and hydrodesulfurization catalyst particles in the inner pipe, while performing the hydrodesulfurization reaction;

(d) Overflowing the mixture from the top of inner pipe into the catalyst-separating zone positioned inside the pressure vessel adjacent to the upper part of the inner pipe, wherein the hydrodesulfurization catalyst starts to separate from the gas-liquid mixture due to the decrease in linear flow rate of the first-formed mixture caused by the greater cross-sectional area of the catalyst-separating zone than that of the inner pipe;

(e) Settling the hydrodesulfurization catalyst separated in the catalyst-separating zone, at the catalyst-settling zone defined by the inner wall of the pressure vessel and outer wall of the inner pipe;

(f) Upflowing again the settled hydrodesulfurization catalyst in a substantially fluidized form, by the action of continuously supplied heavy petroleum hydrocarbon oil and hydrogen-containing gas from the bottom of the inner pipe, and (g) Withdrawing the hydrodesulfurized heavy petroleum hydrocarbon oil separated from the catalyst at the catalyst-separating zone, from the upper part of the pressure vessel, improvement residing in the provision of a funnel-shaped bubble-collecting plate and catalyst particle-catching plate in the catalyst-separating zone, with the tops of such plates being directed upward, in order to promote the catalyst particles-separating effect in such zone.

The bubble-collecting plate is given the form of a hollow, truncated cone, and the flow of hydrodesulfurized heavy petroleum hydrocarbon oil with the bubbles of hydrogen-containing gas upflowing through the catalyst-separating zone is centrally concentrated by this plate.

A part of the minor amount of entrained catalyst particles is settled out by the action of the bubble-collecting plate. To further catch the rest of the catalyst particles, a catalyst particle-catching plate is provided above the bubble-collecting plate.

The catalyst particle-catching plate is given the form of a hollow cone, and at least one hole is bored in the middle portion of the side wall of the cone. The inside uper part of the plate forms a gaseous phase zone because the hydrogen-containing gas is collected therein. It is desirable that the interface of the gaseous phase zone and liquid phase is positioned at approximately the same level as the aforesaid hole or holes. The bubbles of hydrogen-containing gas which leave the bubble-collecting plate rise through the liquid heavy petroleum hydrocarbon oil, up to the interface of the gaseous phase zone and the liquid phase were the bubble-formation stops. The gas is diffused in the gaseous phase zone and caught. The catalyst particles adsorbed at the surfaces of the bubbles are released, and settle through the liquid heavy petroleum hydrocarbon oil. Thus the rise of even a very minor amount of the catalyst particles adsorbed at the surfaces of bubbles is effectively prevented. The gas in the gaseous phase zone forms bubbles again which escape through the hole or holes in the catalyst particle-catching plate, to rise through the oil. The hydrodesulfurized oil free from the bubbles also rise from the lower peripheral part of the catalyst particle-catching plate. Thus the efflux of catalyst particles out of the reaction system, entrained by the bubbles not completely separated at the catalyst-separating zone, is effectively prevented.

The present invention is applicable to all types of gas-liquid-solid fluidized contact apparatus in which, the problem of the outflow small size catalyst particles accompanying the gas-liquid mixture is present, because the minor amount of small size catalyst particles fail to settle due to the turbulence of the liquid in the catalyst-separating zone caused by the rise of bubbles and also due to the adsorbing action of the bubble surfaces.

Hereinafter the process of this invention will be explained in fuller details, with reference to the attached drawing which diagrammatically shows the cross-section of one embodiment of the hydrodesulfurizing reactor useful for the invention.

Referring to the figure, 14 is the catalyst, and 15 denotes the bubbles. The pressure vessel 1 accommodates a cylindrical inner pipe 7. The hydrodesulfurization catalyst is charged at the lower part of the pressure vessel 1. The mixture of heavy petroleum hydrocarbon oil and hydrogen-containing gas enters into the lower part of the pressure vessel 1 via pipe 2 and disperser 4, to substantially fluidize the hydrodesulfurization catalyst. Thus the intimate mixture of the oil, hydrogen-containing gas, and the catalyst particles upflows through the reaction zone 6 inside the inner pipe 7. Thus the hydrodesulfurization reaction is substantially performed in the inner pipe 7. That is, in the reaction zone 6, the catalyst particles are substantially fluidized, and move upward suspended in the oil, and the hydrogen-containing gas forms bubbles which rise through the suspension system. The oil, hydrogen-containing gas, and the hydrodesulfurization catalyst thus passed upward through the reaction zone 6 overflow at the top of inner pipe 7, and enter into the catalyst-separating zone 9. Because the cross-sectional area of the pressure vessel 1 is sufficiently greater than that of the inner pipe 7, at zone 9 the upflow rate of the oil is decreased, and the catalyst particles start to settle. That is, the greatest part of the hydrodesulfurization catalyst precipitates throuhg the catalyst-settling zone 8 between the outer wall of inner pipe 7 and the inner wall of pressure vessel 1, as overflowed from the top of inner pipe 7. Thus precipitated catalyst particles move into the lower part of the reaction zone 6 through the gap formed between the lower periphery of the inner pipe 7 and the conical bottom of pressure vessel 1, to be again entrained by the upflow of heavy petroleum hydrocarbon oil and hydrogen-containing gas, and form the intimate gas-liquid-solid mixture in the reaction zone. On the other hand, at the catalyst-separating zone 9, the oil and hydrogen-containing gas separated from the greatest part of the catalyst still continue to rise through the catalyst-separating zone. They still contain a minor amount of hydrodesulfurization catalyst. A hollow, truncated cone-shaped bubble-collecting plate 10 is provided in the catalyst-separating zone 9. The hydrogen-containing bubbles rising through the zone 9 from the top of inner pipe 7 are collected to the center of the zone by the action of plate 10. At that time a part of the minor amount of the catalyst entrained by the rising bubbles or liquid is separated and settled, as the bubbles or liquid collide against plate 10.

The rest of the minor amount of catalyst accompanies the bubbles as adsorbed at the surfaces of the bubbles under the adsorbing action of the gas-liquid interface, which passes through the opening at the top of bubble-collecting plate 10, to rise successively into the zone defined by the catalyst particles-catching plate 11. Plate 11 is given a form of a hollow-cone, which has at least one, normally plural, holes 12 bored at the middle portion of the wall thereof. In the zone defined by plate 11, that portion above the level of the hole or holes 12 forms a gaseous phase zone 13, in which the rising bubbles are caught. It is desirable that the interface of the gaseous phase zone 13 and the liquid heavy petroleum hydrocarbon oil be positioned at substantially the same level with that of the hole or holes 12. Upon reaching such interface, the hydrogen-containing gas rising through the liquid oil as bubbles stops to form bubbles, and diffuses in the entire gaseous phase zone 13. With the disappearance of bubbles, the gas-liquid interfaces around the bubbles also disappear, and consequently the very minor amount of catalyst particles adsorbed under the action of the gas-liquid interfaces are released, and start to precipitate through the liquid oil. According to the above described procedures, all the hydrogen-containing bubbles which rise via the bubble-collecting plate 10 from the top of inner pipe 7 are once caught at the gaseous phase zone 13 and released from the form of bubbles. Whereas, the gas in the gaseous phase zone again becomes bubbles and rises through the liquid oil from the hole or holes 12 in the catalyst particles-catching plate 11. It should be noted, however, that the newly formed bubbles passing through the hole or holes 12 are different from those rising through the inner pipe 7, in that the former no longer entrain the catalyst particles by adsorption. It should be easily understandable from the foregoing explanation, that from the lower peripheral portion of the catalyst particle-catching plate 11, hydrodesulfurized heavy petroleum hydrocarbon oil free from bubbles rises through the catalyst-separating zone 9. Thus according to the subject process in which a bubble-collecting plate and catalyst particles-catching plate are provided in the catalyst-separating zone, the very minor amount of catalyst particles entrained by the liquid oil and bubbles are subjected to the separating action of each plate, so that the separation and removal of the catalyst particles is substantially completely achieved, and the accompanying efflux of particles out of the reaction system is very effectively prevented.

According to the invention, it is desirable that the diameter of the bottom of bubble-collecting plate 10 should be greater than that of the inner pipe 7. The diameter of the top of plate 10 is variable depending on the volume of flow or flow rate of the liquid and gas, but normally a preferred range is $3/4 - 1/10$ that of the bottom diameter. When it is more than $3/4$, its function to collect bubbles is lost, and if it is less than $1/10$, its flow resistance becomes objectionably great, allowing the bubbles to escape from the bottom of the plate and increasing the catalyst entrainment.

The bottom diameter of the catalyst particle-catching plate 11 is desirably substantially equal with that of the bubble-collecting plate 10. Also the total area of the hole or holes on plate 11 should preferably be less than the top area of plate 10, while care should be taken to avoid excessive accumulation of hydrogen-containing gas in the gaseous phase zone 13, which will cause escape of bubbles from the bottom of plate 11.

According to the hydrodesulfurization process of heavy petroleum hydrocarbon oil of this invention, the charged amount of the starting oil normally ranges, as liquid space velocity to the catalyst (vol.) in the reactor, approximately from 0.2 to 2.0 (v./v./hr.), or, as liquid space velocity to the capacity of hydrodesulfurization reaction zone, from 0.5–5.0 (v./v./hr.). Also the feed amount of hydrogen is preferably in the range of 50–300 H$_2$NTP/feed oil (vol.) to the charged starting oil. Generally in this type of operations, the unreacted hydrogen gas leaving the reactor is normally recirculated into the reactor. This practice is also desirable for the present process. Preferred reaction temperature ranges from 300 to 500° C., and the reaction pressure, from 50 to 300 kg./cm.$^2$.

EXAMPLE 1

The following experiment was performed, using the apparatus specified below:

Reactor: height, 400 cm., diameter, 26 cm.
Inner pipe: height, 350 cm., diameter, 16.5 cm.
The gap between the bottom of reactor; and
Lower periphery of inner pipe: 8 cm.

The bubble-collecting plate was so positioned that its bottom was 10 cm. above the top of inner pipe and the catalyst particle-catching plate was positioned thereabove, its bottom being located 20 cm. above the top of inner pipe. The shape of the bubble-collecting plate was a hollow, truncated cone, the bottom diameter being 17 cm., top diameter, 7 cm., and the height, 4 cm. The shape of the catalyst particles-catching plate was a hollow cone, the bottom diameter being 17 cm., and the height, 8.2 cm. On its inclined side wall 5.2 cm. below the pointed top, 4 holes each 0.5 cm. in diameter were bored at equal intervals at the same peripheral level.

Hydrodesulfurization catalyst:
Particle size, 1.00–0.35 mm. in diameter
Average particle diameter, 0.56 mm.
Apparent specific gravity, 1.58 g./cc.
Amount used, 96 liters
Feed oil: Khafji atmospheric distillation residue
Flow rate: (as superficial velocity in the inner pipe)

khafji atmospheric distillation residue: 3.5 cm./sec.
hydrogen: 1.0 cm./sec.

Reaction temperature: 380–390° C.
Reaction pressure: 200 kg./cm.$^2$ g.

The hydrodesulfurization was performed for 60 hours continuously, under the above-specified conditions. In the meantime, 0.1 vol. percent of the catalyst flowed out of the reactor. When the bubble-collecting plate and catalyst particles-catching plate were removed and the above experiment was repeated, approximately 5 vol. percent of the catalyst was lost by efflux from the reactor.

EXAMPLE 2

The following experiment was performed, using the below-specified apparatus.

Reactor: height, 200 cm., diameter, 10 cm.
Inner pipe: height, 150 cm., diameter, 5 cm.
The gap between the bottom of reactor and lower periphery of inner pipe: 3 cm.

The bubble-collecting plate was so positioned that its bottom was 3.5 cm. above the top of the inner pipe, and the catalyst particle-catching plate was positioned thereabove, its bottom being located 7.5 cm. above the top of the inner pipe. The shape of the bubble-collecting plate was a hollow, truncated cone, the diameter of the bottom thereof being 5.8 cm., that of the top, 2.5 cm., and the height, 1.7 cm. The shape of the catalyst particle-catching plate was a hollow cone having a bottom diameter of 5.8 cm., and a height of 3.0 cm. On the inclined side wall thereof, 4 holes each of 0.2 cm. in diameter were bored at equal lateral intervals, at the peripheral level of 2.2 cm. below the pointed top thereof.

Hydrodesulfurization catalyst:
Particle size, 1.00–0.2 mm. in diameter.
Average particle diameter, 0.617 mm.
Apparent specific gravity, 1.469 g./cc.
Amount used, 7 liters.
Feed oil: Khafji atmospheric distillation residue.
Flow rate: (as superficial velocity in the inner pipe).

khafji atmospheric distillation residue: 4.2 cm./sec.
hydrogen: 0.5 cm./sec.

Reaction temperature: 380°–390° C.
Reaction pressure: 200 kg./cm.$^2$ g.

The hydrodesulfurization was performed for 100 hours continuously, under the above-specified conditions. In the meantime, 0.15 vol. percent of the catalyst flowed out of the reactor.

When the bubble-collecting plate and catalyst particle-catching plate were removed and the above experiment was repated, approximately 3 vol. percent of the catalyst was lost from the reactor by efflux.

What is claimed is:

1. In a process for the prevention of catalyst efflux in the hydrodesulfurization of a heavy petroleum hydrocarbon oil in a hydrodesulfurizing reactor composed of a cylindrical pressure vessel accommodating therein a coaxially positioned cylindrical inner pipe, by the steps comprising:

(a) feeding hydrodesulfurization catalyst particles into the hydrodesulfurizing reactor, (b) introducing heavy petroleum hydrocarbon oil and hydrogen-containing gas into the reactor from the lower part of said inner pipe to substantially fluidize the hydrodesulfurization catalyst particles, (c) upflowing the mixture of said oil, hydrogen-containing gas, and catalyst particles in said inner pipe, while performing the hydrodesulfurization reaction, (d) overflowing a reaction mixture from the top of said inner pipe into the catalyst-separating zone positioned inside the pressure vessel adjacent to the upper part of said inner pipe, wherein the hydrodesulfurization catalyst starts to separate from the gas-liquid mixture due to the decrease in linear flow rate of the reaction mixture caused by the greater cross-sectional area of the catalyst-separating zone than that of said inner pipe, (e) settling the hydrodesulfurization catalyst separated in the catalyst-separtting zone, at the catalyst-settling zone defined by the inner wall of the pressure vessel and outer wall of said inner pipe, (f) upflowing again the settled hydrodesulfurization catalyst in a substantially fluidized form, by the action of continuously supplied heavy petroleum hydrocarbon oil and hydrogen-containing gas from the bottom of said inner pipe, and (g) withdrawing the hydrodesulfurized heavy petroleum hydrocarbon oil separated from the catalyst at the catalyst-separating zone, from the upper part of the pressure vessel, the improvement residing in that a hollow conical catalyst particle-catching plate having at least one hole bored on the inclined side wall thereof, the holes being bored along the same peripheral level when plural holes are present, and a hollow, truncated conical bubble-collecting plate with an open top, are provided concentrically along the vertical axial line of the catalyst-separating zone, the former plate being located above the latter, the bubble collecting plate serving to gather the bubbles of hydrogen-containing gas to the central part of the catalyst-separating zone, and the catalyst particle-catching plate serving to further catch the bubbles to form a gaseous phase zone at the upper inside part of the cone, thereby causing the release of a minor amount of hydrodesulfurization catalyst adsorbed at the bubble surfaces upon disappearance of the bubbles at the interface of the gaseous phase and liquid phase so as to precipitate the catalyst particles through the liquid, the caught hydrogen-containing gas rising again as bubbles through the holes in the catalyst particle-catching plate, and the hydrodesulfurized heavy petroleum hydrocarbon oil containing no bubbles also rising from the vicinity of the lower periphery of said catalyst particle-catching plate, thus preventing the discharge of even a minor amount of catalyst particles from the reaction system as entrained by the bubbles, while accomplishing complete separation of the catalyst particles at the catalyst-separating zone.

2. The process of claim 1, wherein the diameter of the bottom of said bubble-collecting plate is greater than that of the inner pipe, and the diameter at the top of said bubble collecting plate ranges from $3/4$ to $1/10$ that of its bottom.

3. The process of claim 1, wherein the diameter of the bottom of said catalyst particle-catching plate is substantially the same with that of the bottom of said bubble-collecting plate.

4. The process of claim 1, wherein plural holes are bored on the catalyst particle-catching plate.

5. The process of claim 1, wherein the total area of the holes on said catalyst particle-catching plate is less than the area of the opening on the top of said bubble-collecting plate.

References Cited
UNITED STATES PATENTS

| | | | |
|---|---|---|---|
| 3,003,580 | 10/1961 | Lanning | 208—157 |
| 3,583,905 | 6/1971 | Oguchi et al. | 23—288 S |
| 3,622,265 | 11/1971 | Weber et al. | 208—21 B |

HERBERT LEVINE, Primary Examiner

U.S. Cl. X.R.

23—288 E, 288 S; 208—213